US009286570B2

(12) United States Patent
Proctor et al.

(10) Patent No.: US 9,286,570 B2
(45) Date of Patent: Mar. 15, 2016

(54) PROPERTY REACTIVE MODIFICATIONS IN A RETE NETWORK

(71) Applicant: Red Hat, Inc., Raleigh, NC (US)

(72) Inventors: Mark Proctor, London (GB); Mario Fusco, Milan (IT)

(73) Assignee: Red Hat, Inc., Raleigh, NC (US)

( * ) Notice: Subject to any disclaimer, the term of this patent is extended or adjusted under 35 U.S.C. 154(b) by 650 days.

(21) Appl. No.: 13/739,786

(22) Filed: Jan. 11, 2013

(65) Prior Publication Data
US 2014/0201124 A1 Jul. 17, 2014

(51) Int. Cl.
*G06N 5/02* (2006.01)
*G06N 5/04* (2006.01)

(52) U.S. Cl.
CPC ...................... *G06N 5/047* (2013.01)

(58) Field of Classification Search
None
See application file for complete search history.

(56) References Cited

U.S. PATENT DOCUMENTS

| | | | |
|---|---|---|---|
| 5,720,009 A * | 2/1998 | Kirk et al. | 706/47 |
| 2004/0034848 A1 | 2/2004 | Moore et al. | |
| 2005/0240546 A1 | 10/2005 | Barry | |
| 2005/0246302 A1 | 11/2005 | Lorenz et al. | |
| 2009/0063385 A1 | 3/2009 | Proctor | |
| 2009/0157586 A1 * | 6/2009 | Zhang et al. | 706/47 |
| 2011/0055137 A1 | 3/2011 | Proctor et al. | |

OTHER PUBLICATIONS

TheServerSide.com, "An Introduction to the Drools Project," May 2004, Copyright 2000-2011, 7 pages.
"Drools Introduction and General User Guide," JBoss.com, retrieved May 24, 2011, 69 pages.
Stolfo et al., "The ALEXSYS Mortgage Pool Allocation Expert System: A Case Study of Speeding Up Rule-based Programs," Columbia University, pp. 1-37, Jul. 1990.
Tirelli, Edson, "Cleaning up the ANTLR DRL grammar," Blog dated May 5, 2007 to May 30, 2007, 18 pages.
Proctor, Mark, "JBoss Drools BRMS Standalone," Blog dated Jul. 5, 2001 to Jul. 30, 2007, 12 pages.
Proctor, Mark, "Drools vs JRules Performance and Future R&D," Blog dated Aug. 1, 2007 to Aug. 31, 2007, 17 pages.
Tirelli, Edson, "Drools & jBPM, All things Artificial Intelligence related: Rules, Processes, Events, Agents, Planning, Ontologies and more," Blog dated Mar. 1, 2007 to Mar. 27, 2007, Available: http://blog.athico.com/2007_03_01_archive.html, 13 pages.
Proctor, Mark, "Drools & jBPM, All things Artificial Intelligence related: Rules, Processes, Events, Agents, Planning, Ontologies and more," Blog dated Jan. 27, 2007, Available: http://blog.athico.com/2007_01_01_archive.html, 9 pages.

(Continued)

*Primary Examiner* — Alan Chen
(74) *Attorney, Agent, or Firm* — Lowenstein Sandler LLP

(57) ABSTRACT

A processing device executing a Rete rule engine modifies a particular property of an object that has traversed a Rete network. The processing device associates a first data structure with the object, the first data structure indicating that the particular property of the object has been modified. The processing device then determines whether the particular property is a constraint relevant to a node of the Rete network based on comparing the first data structure to a second data structure associated with the node, wherein the second data structure identifies one or more modifiable properties that are constraints relevant to the node. If the particular property is a constraint relevant to the node, the processing device evaluates the object with the node. If the particular property is not a constraint relevant to the node, the processing device determines not to evaluate the object with the node.

20 Claims, 10 Drawing Sheets

(56) References Cited

OTHER PUBLICATIONS

Proctor, Mark, "Drools & jBPM, All things Artificial Intelligence related: Rules, Processes, Events, Agents, Planning, Ontologies and more," Blog dated Feb. 7, 2007 to Feb. 19, 2007, Available: http://blog.athico.com/2007_01_01_archive.html, 9 pages.

Proctor, Mark, "Drools & jBPM, All things Artificial Intelligence related: Rules, Processes, Events, Agents, Planning, Ontologies and more," Blog dated Jun. 2, 2006 to Dec. 11, 2006, Available: http://blog.athico.com/search?updated-min=2006-01-01T00%3A00%3A00Z&updated-max=2007-01-01T00%3A00%3A00Z&max-results=19 , 22 pages.

Proctor, Mark, et al., Drools, Drools Documentation 4.0.7, Available: http://downloads.jboss.com/drools/docs/4.0.7.19894.GA/html_single/index.html 194 pages.

Proctor, Mark, JBoss Rules, Change the Rules of the Game, Blog dated Jun. 1, 2001 to Jun. 29, 2007, Available: http://blog.athico.com/2007_06_01_archive.html, 44 pages.

\* cited by examiner

PROPERTY REACTIVE MODIFICATIONS IN A RETE NETWORK

TECHNICAL FIELD

Embodiments of the present invention relate to rule engines, and more specifically to an optimization of a Rete rule engine.

BACKGROUND

The development and application of rule engines is one branch of Artificial Intelligence (A.I.), which is a research area that focuses on "making computers think like people." Broadly speaking, a rule engine processes information by applying rules to data objects (also known as facts). Various types of rule engines have been developed to evaluate and process rules. One conventional type of rule engine is a Rete rule engine. A Rete rule engine implements a Rete network to process rules and data objects. An object is compared against each of the rules in a rule set to determine whether the object satisfies all of the constraints of any of the rules. An object that satisfies all of the constraints associated with a rule may then be modified based on an action associated with that rule.

For a conventional Rete rule engine, if an object is modified by the Rete rule engine, that object is then again compared against all of the rules in the rule set. This often results in a loop, in which objects are modified, then matched against the rule set, then modified, again matched against the rule set, and so on. Such repeated matching against all of the rules in the rule set can be processor intensive and time consuming. Additionally, such repeated matching may cause infinite loops in some instances.

BRIEF DESCRIPTION OF THE DRAWINGS

The present invention is illustrated by way of example, and not by way of limitation, in the figures of the accompanying drawings and in which.

DETAILED DESCRIPTION

Figure 1:
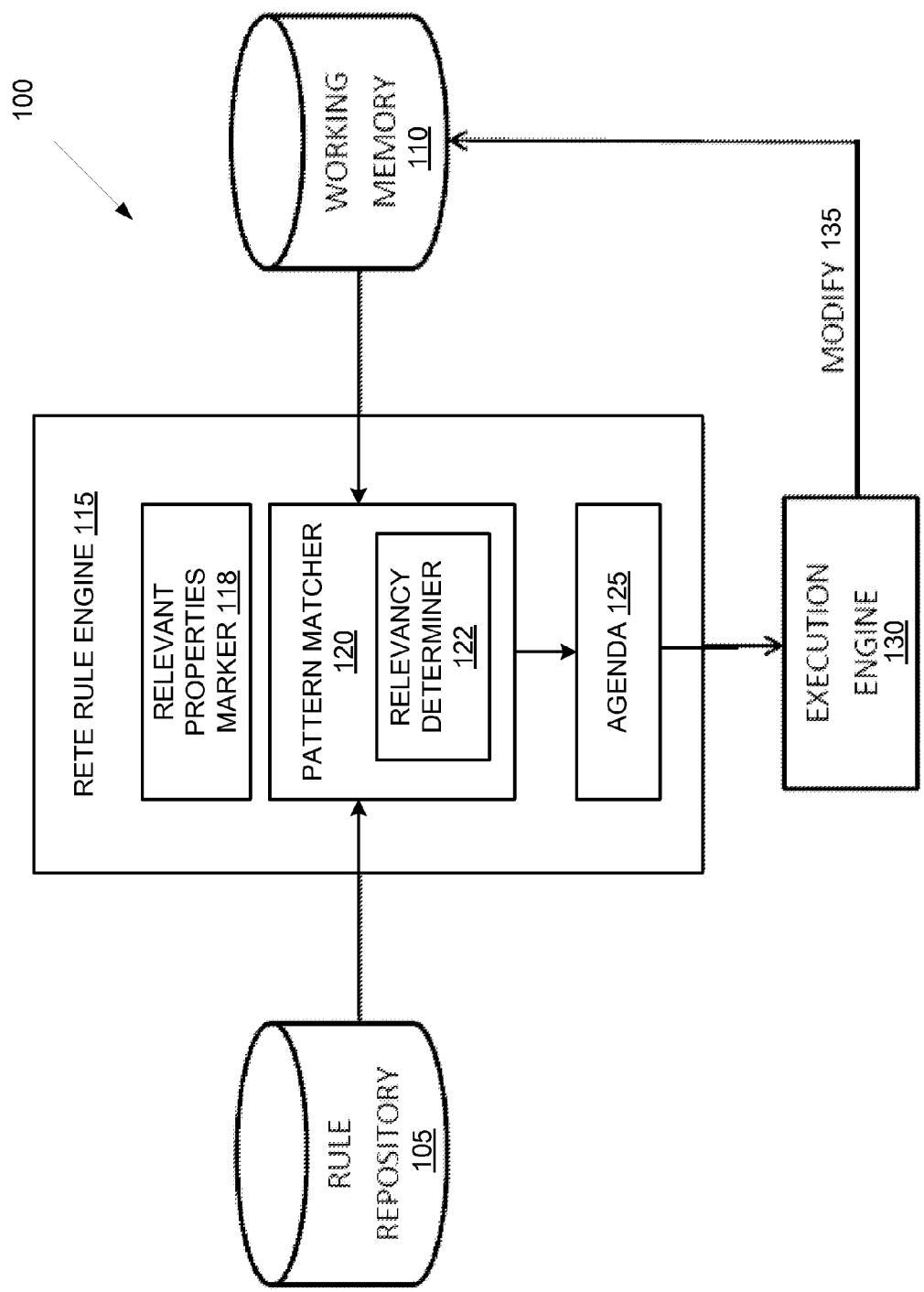
FIG. 1 illustrates an example system that implements a Rete rule engine.

Described herein are some embodiments of an improved Rete rule engine that determines whether to attempt to match a modified object against rules in a rule set based on a property or properties of the object that were modified. In one embodiment, a Rete rule engine sets up a Rete network, and generates relevant properties data structures for some or all of the nodes in the Rete network. A relevant properties data structure associated with a node identifies which properties of one or more particular object types are relevant to that node. When an object is modified by the Rete rule engine, the Rete rule engine associates a modified properties data structure to the modified object. Before the modified object is compared against the rules in a rule set, the modified properties data structure is compared to the relevant properties data structures of one or more nodes in the Rete network. If the modified properties do not correspond to any relevant property of a relevant properties data structure of a node, then the modified object is not compared against any further constraints of the rule or rules with which that node is associated. This can substantially reduce a number of pattern matches that the Rete rule engine performs. The reduction in pattern matches can reduce processor utilization and improve performance of the Rete rule engine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "modifying" or "computing" or "processing" or "determining" or "associating" or the like, refer to the action and processes of a computing device, or similar electronic computing device, that manipulates and transforms data represented as physical (electronic) quantities within the computing device's registers and memories into other data similarly represented as physical quantities within the computing device memories or registers.

FIG. 1 illustrates an example system 100 that implements a Rete rule engine 115. The system 100 includes a rule repository 105, a working memory 110 and an execution engine 130 in addition to the Rete rule engine 115. The rule repository 105 (also referred to as a production memory) may include an area of memory and/or secondary storage that includes rules that will be used to evaluate objects. The rule repository 105 may include a directory of a file system, may be a rule database, may be a table of rules, or may be some other data structure for storing a rule set (also referred to as a rule base). Each rule in the rule set has a left hand side that corresponds to the constraints of the rule and a right hand side that corresponds to an action or actions to perform if the constraints of the rule are satisfied. The working memory 110 stores data objects (also referred to as facts) that have been asserted (e.g., objects that are to be matched against the rule set).

The Rete rule engine 115 sets up a Rete network based on the rule set in the rule repository 105. The Rete network is a network of nodes, where a majority of the nodes correspond to conditions associated with at least one rule from the rule set. Where multiple rules have the same condition, a single node may be shared by the multiple rules. The Rete network includes multiple different types of nodes, such as object type nodes (OTN), alpha nodes, left input adapter nodes, eval Nodes, Rete nodes (also known are root nodes), join nodes, not nodes, and rule terminal nodes. The Rete network including the different nodes is constructed as a directed acyclic graph that represents a rule set.

In one embodiment, the Rete rule engine 115 includes a relevant properties marker 118. To enable property reactivity on a Rete network, the relevant properties marker 118 may perform a compile-time analysis of the rule base as the Rete network is generated (e.g., as nodes are established in the Rete network). Alternatively, such analysis may be performed after the Rete network is established. Based on this analysis, the relevant properties marker 118 may enrich the nodes of the Rete network with information that, at runtime, allows the Rete rule engine 115 to reduce rematching to the patterns strictly involving the object's properties that have been actually modified by a formerly executed rule. For example, relevant property marker 118 may determine, for each node, those object properties that are constraints of that node. This may also include determining user defined relevant properties that are not necessarily constraints of the nodes. Additionally, this may include determining constraints of downstream nodes (e.g., subordinate nodes) and/or upstream nodes (e.g., parent nodes). Once the relevant object properties associated with a node are identified, relevancy determiner 122 may generate a relevant properties data structure for that node and associate the relevant properties data structure with the node. The relevant properties data structure may be, for example, a bitmask in which each bit of the bitmask represents an object property. Set bits in the bitmask may indicate that object properties associated with those set bits are relevant to the node associated with the bitmask.

For any given pattern, the list of properties for which pattern matching is to be reevaluated when an object is modified can be automatically inferred from the patterns themselves. However, as mentioned, it is also possible to modify this list of properties by declaratively adding other properties to it, referred to herein as watched properties or observed properties, according with the specific needs for a given rule.

In addition to performing the compile-time analysis to identify relevant properties and create data structures indicating the relevant properties, relevant properties marker 118 may update the data structures as new rules are added to the rule set and/or existing rules are removed from the rule set. Nodes related to the portion of the Rete network involved in the network changes caused by the dynamic addition, removal or modification of a rule may change. Accordingly, relevant properties marker 118 may update the data structures associated with these nodes in the Rete network as the rule base for the Rete network changes.

In one embodiment, the relevant properties marker 118, for each object type in a used domain model, makes a list of all the modifiable properties and sorts them unambiguously (e.g. alphabetically). When an alpha node is added to the Rete network, relevant properties marker 118 determines the property or properties used in the node's constraint pattern (e.g.: Person (age=35) would provide the "age" property from the type Person). The relevant properties marker 118 then generates a data structure (e.g., a bitmask) that identifies the determined property. In one embodiment, the relevant properties marker 118 generates a relevant properties bitmask (referred to as a declared alpha mask in one embodiment) having a 1 in the position corresponding to the matching property in the list of the settable properties for the given object type. Relevant properties marker 118 may then store the relevant properties data structure in the alpha node.

When a beta node is added to the Rete network, that beta node will have a left input and a right input. If the left input is connected to a left input adapter node, the relevant properties marker 118 gathers all the "watched properties" (if any) for the formerly declared pattern (the one related to the alpha node that is the source of the left input adapter node) and stores into the beta node a left relevant properties data structure. The left relevant properties data structure may be a bitmask (referred to as a declared left mask in one embodiment) with is in all the positions corresponding to these properties in the modifiable property list of the type used in the alpha node's pattern. Conversely, if the left input is connected to another beta node, that other beta node's declared pattern and/or watched properties are not relevant for the definition of the left relevant properties data structure. In this case, a left modification does not block anything so this mask can be made of all 1 s.

For the beta node, the relevant properties marker 118 gathers all the "watched properties" for the pattern related with this beta node and creates a right relevant properties data structure accordingly. Note that for both the right relevant properties data structure and the left relevant properties data structures, if the set of the "watched properties" is empty these data structures may be bitmasks made of all 0 s.

In one embodiment, if the left input of the beta node is a left input adapter node, the left relevant properties data structure may be sent to its source (the alpha node). Relevant properties marker 118 may add the left relevant properties data structure (e.g., with a bitwise OR) to the relevant properties data structure of the alpha node and store the result in another data structure of the alpha node called an inferred relevant properties data structure (an inferred alpha mask in one embodiment). If the alpha node is, indirectly, the left source of other beta nodes it will keep accumulating all their left relevant properties data structures in its inferred relevant properties data structure. In this way the alpha node won't block the propagation of any modification that should be propagated also by at least one of its sink beta nodes. It will be up to the beta nodes to block unwanted propagations of objects when appropriate.

In one embodiment, relevant properties marker 118 adds the relevant properties data structure of the alpha node to the left relevant properties data structure of the beta nodes that are subordinate to it. For example, relevant properties marker 118 may perform a bitwise OR of the alpha node's relevant properties data structure and the beta node's left relevant properties data structure to create an inferred left relevant properties data structure (an inferred left mask in one embodiment).

If the right input of the beta node is an alpha node, then the right relevant properties data structure of the beta node is sent to the alpha node. The relevant properties marker 118 may update that alpha node's inferred relevant properties data structure in the same way described above. Likewise, the alpha node returns to the beta node its relevant properties data structure. Relevant properties marker 118 may create an inferred right relevant properties data structure for the beta node based on a bitwise OR of the alpha node's relevant properties data structure and the beta node's right relevant properties data structure.

When a rule terminal node is added to the Rete network, if its source is a left input adapter node, the relevant properties marker 118 gathers all the "watched properties" for the formerly declared pattern and stores them in the terminal node in an inferred relevant properties data structure (an inferred terminal mask in one embodiment). This may be a bit mask calculated in the same way as described above. Conversely, if the rule terminal node's source is a beta node, propagation of objects may be blocked at the terminal node level because any blocking can be already performed at a preceding beta node. In this last case the inferred relevant properties data structure for the terminal node may be a bitmask made of all 1 s. Additionally, if the source of the rule terminal node is a left input adapter node, the relevant properties data structure of the terminal node is sent to the alpha node, which updates its inferred relevant properties data structure by adding to it (e.g., via bitwise OR) indicators for the rule terminal node's relevant properties. Also, the alpha node returns to the terminal node the alpha node's relevant properties data structure, and the relevant properties marker 118 calculates for the rule terminal node another an inferred relevant properties data structure.

In one embodiment, for each node, the resulting final inferred relevant properties data structure (the one actually used to determine if the node should propagate the modified object to the lower nodes of the Rete network) is a combination of all the masks after it. Thus, each relevant properties data structure is decreasingly permissive as you propagate from an object type node to the rule terminal node.

If a new rule is dynamically added to the rule repository, the relevant properties marker 118 can modify the inferred relevant properties data structures of the existing nodes, if appropriate, following the same algorithm defined above. Assuming that every rule keeps a list of all the nodes in the Rete network used by it, if a rule is dynamically removed from the rule repository 105, such lists may be iterated in order to find the set of the nodes, still in use after the removal, having a stale inferred relevant properties data structure. This set may be generated by recursively adding to it all the sinks of the nodes related with the removed rule. For each beta and terminal nodes in this set, their inferred masks may be reinitialized following the same steps described above. The execution of these algorithms may have the side effect of reinitializing also the inferred masks of the alpha nodes that are sources of those beta and terminal nodes.

In addition to creating the relevant properties data structures, relevant properties marker 118 may analyze rules to identify every possible rule action that modifies objects. For every consequence modifying an object, relevant properties marker 118 may determine the set of modified properties caused by execution of a rule, and create a modified properties data structure for that rule. The modified properties data structure may be a bitmask with a 1 in the positions corresponding to these properties in the list of the modifiable properties for the modified object. The relevant properties marker 118 may then rewrite the modification statement of that rule adding the association of the modified properties data structure to the modified object as a second argument to the rule execution. At a runtime, when a consequence containing a modify statement is triggered, the execution engine 130 will send to the Rete network the previously computed modified properties data structure together with the modified object. When the modified object traverses the Rete network, a relevancy determiner 122 may evaluate the modified properties data structure to determine whether the modified object is to be evaluated.

Note that a majority of the computations of the algorithm described above may be performed during the compilation phase of the Rete network. Additional operations to be executed at runtime may be simple bitwise AND operations between the inferred relevant properties data structures associated with nodes and the modified properties data structure associated with the modified object. This operation is extremely fast, so the overhead added by it is negligible, especially when compared with the time saved by avoiding unnecessary propagations of data objects into the Rete network together with all the associated constraint evaluations.

The Rete rule engine 115 includes a pattern matcher 120 and an agenda 125. The pattern matcher 120 implements a Rete network (such as the Rete networks 200-500 shown in FIGS. 2-6) to evaluate the rules from the rule repository 105 against the data objects from the working memory 110. The pattern matcher 120 takes objects from working memory 110, and matches properties of the objects against constraints of the nodes in the Rete network. The pattern matcher 120 traverses the Rete network for objects, first matching the properties of the object against object type nodes, and then alpha nodes and/or beta nodes that are children of the object type nodes, and then those node's children, and so on. The path from the root node to a rule terminal node defines a complete rule left hand side (all the constraints associated with the rule). As new objects (commonly referred to as facts) are evaluated by pattern matcher 120, these objects propagate along the Rete network. If the objects satisfy the constraints of a node, the pattern matcher annotates that node with an indication that the object satisfies the constraints. When an object or combination of objects causes all the constraints for a given rule to be satisfied, a rule terminal node is reached and the corresponding rule is triggered. When this occurs, the pattern matcher 120 adds the object or combination of objects to the agenda 125 along with an indication of the rule whose conditions were satisfied. All nodes may have memory to store a reference to the objects and tuples propagated to them, if any. If a rule fails to be fully matched, then no corresponding activation results.

The agenda 125 provides a list of rules to be executed and objects on which to execute the rules. Execution engine 130 executes operations defined in the right side of rules that are indicated in the agenda 125. Often, such execution of operations causes the properties of one or more objects to be modified. If an object is to be modified, the execution engine 130 modifies 135 the object in working memory 110, and the Rete rule engine 115 will again evaluate the modified object using the Rete network.

To maximize performance of the Rete rule engine 115, pattern matcher 120 includes a relevancy determiner 122. When a modified object is to be evaluated by pattern matcher 120, relevancy determiner 122 may compare the modified properties data structure associated with that modified object to the relevant properties data structures of nodes before the modified object is evaluated against the constraints of those nodes. If none of the relevant properties for a node have been modified in the object (e.g., are not indicated in the modified properties data structure), then the object may be dropped from further analysis by the node and all of its subordinate nodes. If a modified property of the object corresponds to a relevant property of a node, then the object may be matched against the constraints of the node, and sent on to a next node or nodes in the Rete network. Again, the modified properties data structure may be compared by the relevancy determiner 122 against the relevant properties data structure of the subsequent node before evaluating the object. This may considerably reduce an amount of computations that are performed by the pattern matcher 120.

Figure 2:
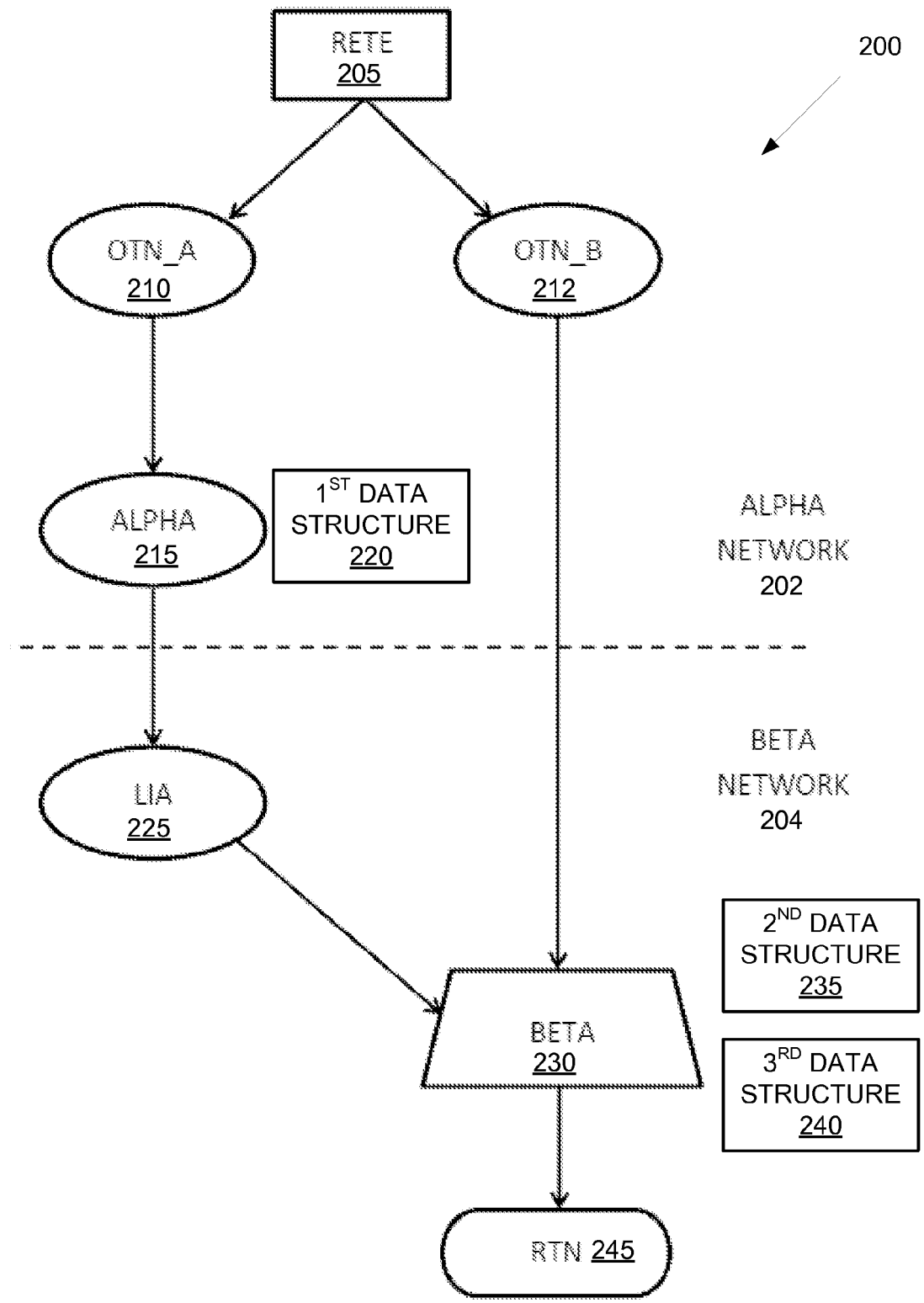
FIG. 2 illustrates a simple example Rete network having a single rule, in accordance with one embodiment of the present invention.

FIG. 2 illustrates a simple example Rete network 200 having a single rule, in accordance with one embodiment of the present invention. It should be understood that in most instances a Rete network will include multiple rules and have more nodes than those shown in the provided example. Each rule would be represented by a separate rule terminal node.

The Rete network 200 is logically divided into an alpha network 202 and a beta network 204. The alpha network 202 includes a root node (also referred to as a Rete node) 205, object type nodes (e.g., object type node A (OTN_A) 210 and object type node B (OTN_B) 212), and alpha nodes (e.g., alpha node 215). The beta network includes left input adapter (LIA) nodes (e.g., LIA 225), beta nodes (e.g., beta node 230) and rule terminal nodes (RTN) (e.g., RTN 245), and may additionally include other node types.

Data objects enter the Rete network 200 at the root node 205, from which they are propagated to any matching object type nodes (e.g., object type node A (OTN_A) 210 and/or object type node B (OTN_B) 212). From an object type node (OTN_A 210 or OTN_B 212), a data object may be propagated to either an alpha node (if there is a literal constraint) 215 or a beta node 230 if the object is of the proper object type. Object type nodes and alpha nodes are one input nodes, and compare a single input object to one or more intra-object constraints of the nodes.

If the object is a modified object that has a modified properties data structure associated with it, the modified properties data structure is compared against a first relevant properties data structure 220 associated with the alpha node. If the modified properties data structure indicates that no properties of the object that are relevant to the alpha node 215 have been modified, then the object will not further progress along that path of the Rete network 200. If the modified properties data structure 220 indicates that a modified property is relevant to the alpha node 215, then the object will be evaluated against the alpha node 215 and then output to left input adapter node (LIA) 225. A LIA 225 creates a tuple with a single object and propagates the tuple created to the left input of a beta node 230 connected to the LIA 225. The tuple may be associated with the modified properties data structure that was originally associated with the object.

A beta node 230 is a two input node that includes a left input and a right input. Join nodes, not nodes, and exists nodes are some examples of beta nodes. Beta nodes apply inter-object constraints to a pair of objects rather than to a single object. A beta node 230 can receive tuples in its left input and objects in its right input. The beta node 230 may receive tuples for objects from the LIA 225. If a received tuple is associated with a modified properties data structure, the beta node may compare the modified properties data structure against a second relevant properties data structure 235 associated with a left input of the beta node 230. If a modified property of the tuple is relevant to the left input of the beta node, then the tuple may be placed into a left input memory of the beta node 230. The beta node 230 may additionally receive objects from OTN_B 212, and may place the objects into a right input memory. If a received object is associated with a modified properties data structure, the beta node 230 may compare the modified properties data structure against a third relevant properties data structure 240 associated with a right input of the beta node. If a modified property of the object is relevant to the right input of the beta node 230, the object may be placed into the right input memory of the beta node 230.

The beta node 230 may then make join attempts between the objects in the right input memory and the tuples in the left input memory. If a join attempt is successful, the object is added to the tuple and then propagated to the left input of the next node until the tuple reaches a rule terminal node (RTN) 245. The tuples stored in the left input memories are partially matched. When a tuple reaches a rule terminal node 245, the tuple is fully matched. For example, if a tuple output by LIA 225 successfully joins with an object from OTN_B 212, then the tuple is propagated to the rule terminal node 245. At the rule terminal node 245, an activation is created from the fully matched tuple and a rule corresponding to the rule terminal node 245. The activation is placed onto an agenda of the Rete rule engine for potential firing or potential execution.

Figure 3:
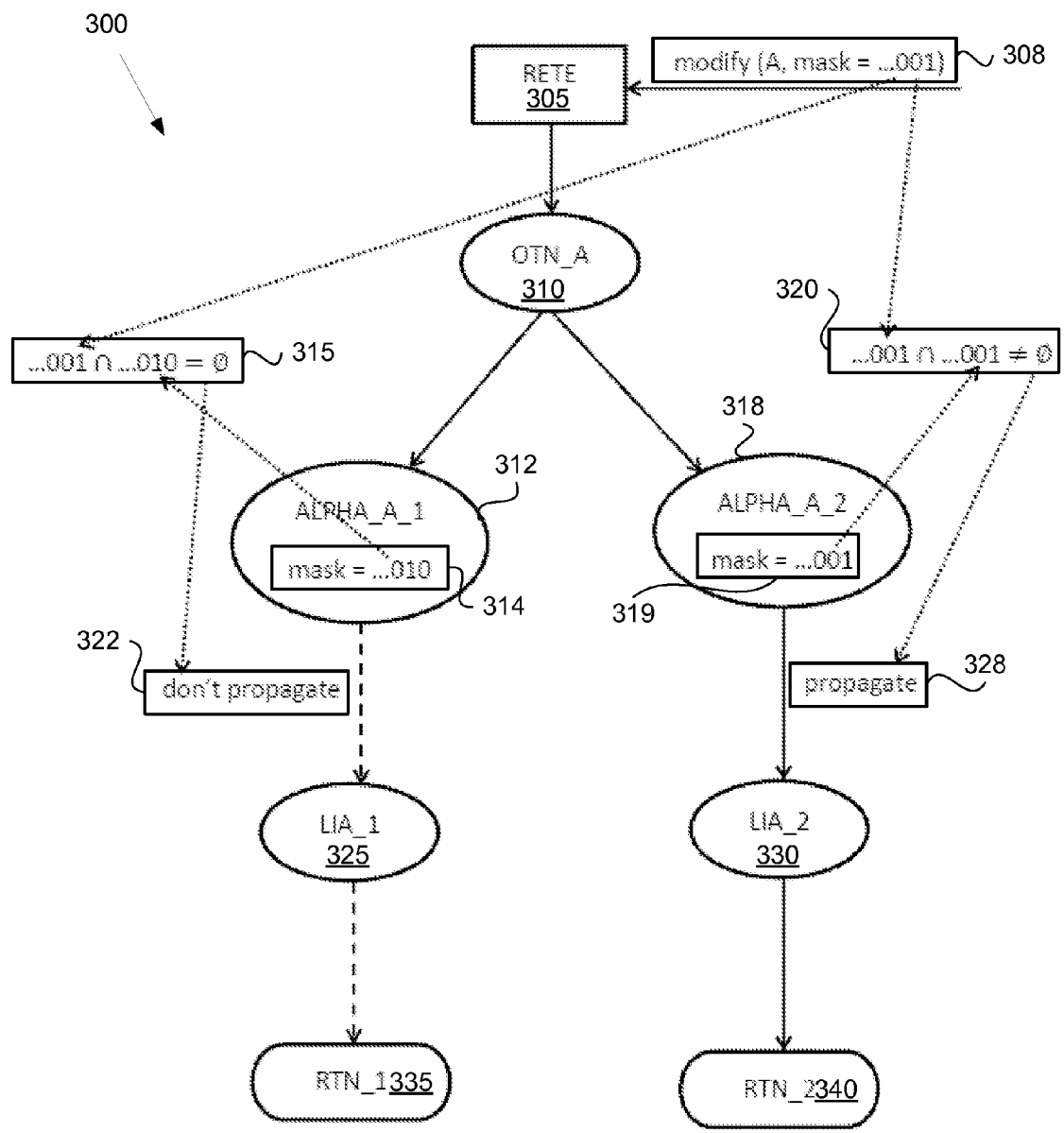
FIG. 3 illustrates propagation of a modified object through an example Rete network, in accordance with one embodiment of the present invention.

FIG. 3 illustrates propagation of a modified object through an example Rete network 300, in accordance with one embodiment of the present invention. A modified object 308 having an object type A and an associated modified properties bitmask " . . . 001" is input into a Rete node 305. An object type node (OTN_A) 310 determines that the modified object has object type A, which is an object type of the object type node 310. Accordingly, the modified object is propagated to two alpha nodes Alpha_A_1 312 and Alpha_A_2 318.

At Alpha_A_1 312 the modified properties bitmask is compared against a relevant properties bitmask 314, the relevant properties bitmask 314 having a value of " . . . 010". An intersection operation 315 may be performed between the relevant properties bitmask 314 and the modified properties bitmask of the object 308 to determine whether any modified properties of the modified properties bitmask are relevant to the alpha node 312. Since there is no intersection between the modified properties bitmask and the relevant properties bitmask 314, the object is not added to an input memory of the alpha node 312 and is not propagated 322 to a left input adapter LIA_1 325 or to a rule terminal node RTN_1 335.

At Alpha_A_2 318, the modified properties bitmask is compared against a relevant properties bitmask 319, the relevant properties bitmask 319 having a value of " . . . 001". An intersection operation 320 may be performed between the relevant properties bitmask 319 and the modified properties bitmask of the object 308 to determine whether any modified properties of the modified properties bitmask are relevant to the alpha node 318. Since there is an intersection between the modified properties bitmask and the relevant properties bitmask 319, the object is added to an input memory of the alpha node 318 and is propagated 328 to a left input adapter LIA_2 330 and then to a rule terminal node RTN_2 340.

Figure 4:
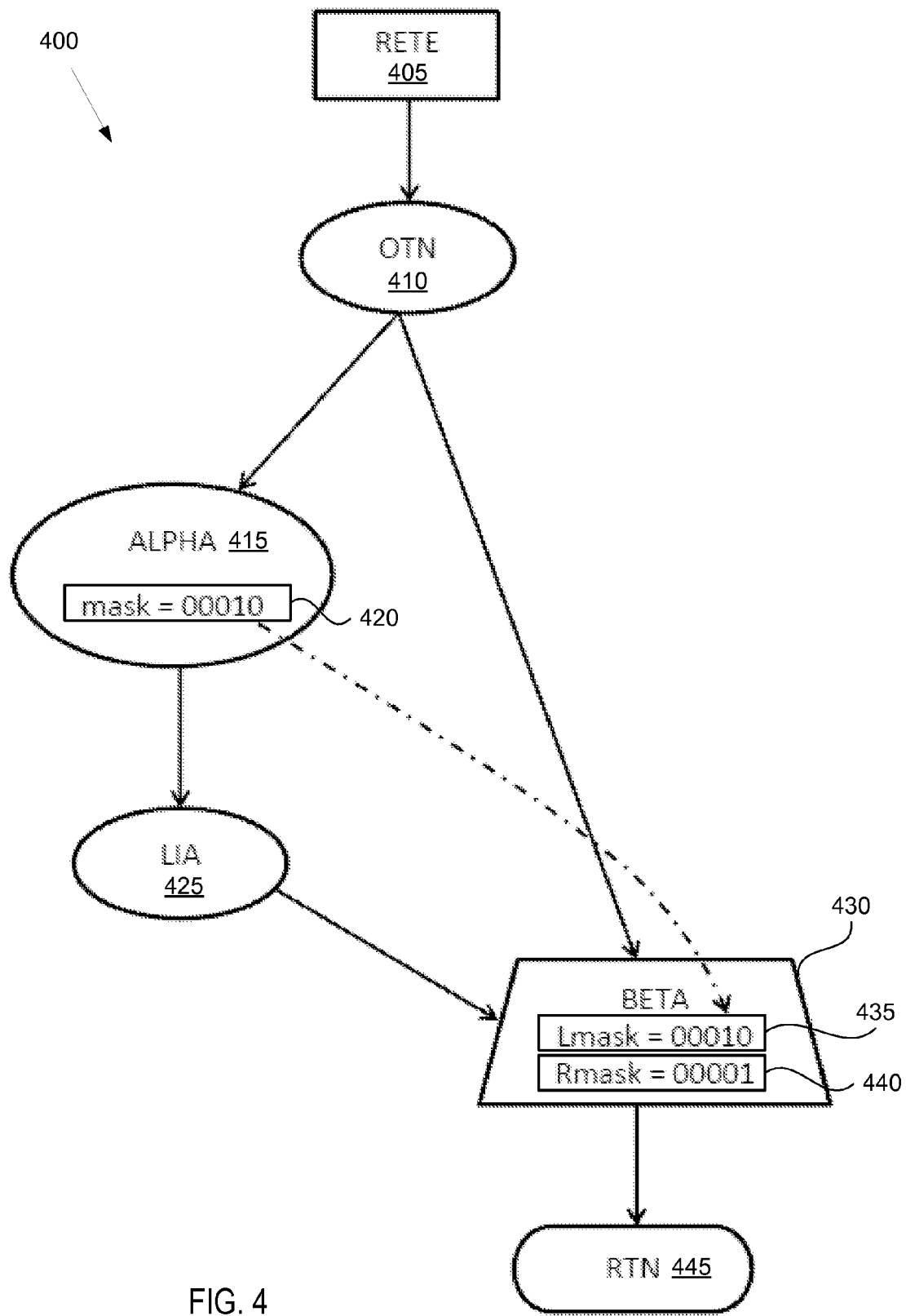
FIG. 4 illustrates a another example Rete network having a single rule, in accordance with one embodiment of the present invention.

FIG. 4 illustrates another example Rete network 400 having a single rule, in accordance with one embodiment of the present invention. The Rete network 400 includes a Rete node 405, an object type node 410, an alpha node 415, a left input adapter node 425, a beta node 430 and a rule terminal node 445. As shown, the alpha node 415 includes a relevant properties bitmask 420 that identifies modifiable properties of a particular object type that are constraints of the alpha node 415. The relevant properties bitmask 420, with a value of 00010, indicates that a second property of the object type is a constraint of the alpha node.

In this example, a left input of the beta node 430 does not have any new constraints for objects. However, the relevant properties bitmask associated with the alpha node 415 is added as the left input mask 435 for the beta node 430. This is because any properties of objects that are relevant to the alpha node 415 are also considered as relevant to the beta node 430 that is subservient to the alpha node 415. A right input mask 440 of the beta node 430 identifies properties of the object type that are constraints of the beta node's right input. In the provided example, the right input mask 440, with a value of 0001, indicates that a first property of the object type is a constraint of the right input for the beta node 430. Accordingly, any join of a first object from the left input of the beta node 430 for which the second property of the object has been modified and a second object from the right input of the beta node 430 for which the first property of the object has been modified would be evaluated by the beta node 430 and passed to the rule terminal node 445. Note that in some instances the same object may be joined with itself in the left input and the right input (e.g., if both the first property and second property of that object were modified).

Figure 5:
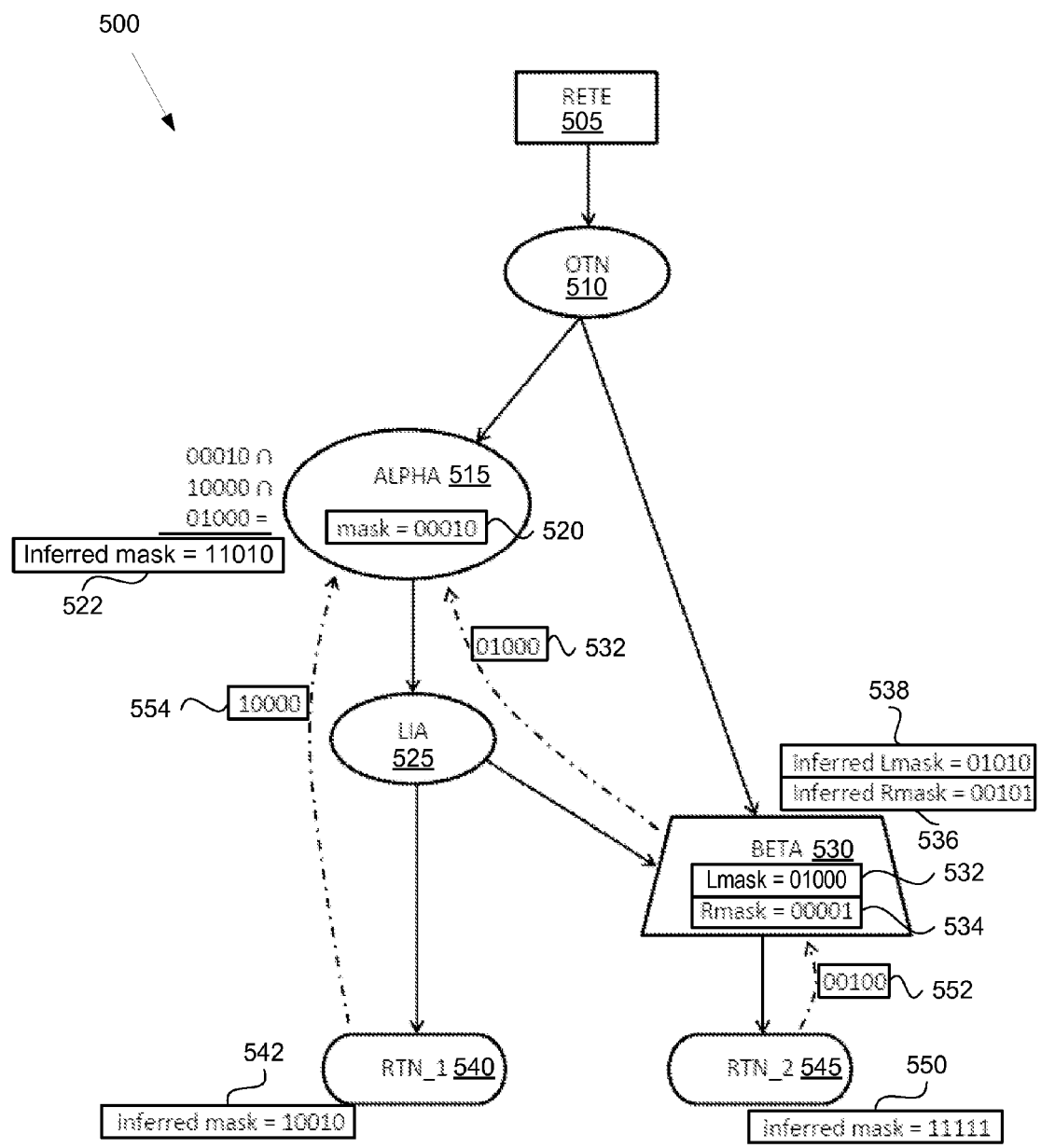
FIG. 5 illustrates another example Rete network, in accordance with an embodiment of the present invention.

FIG. 5 illustrates another example Rete network 500, in accordance with an embodiment of the present invention. The Rete network 500 includes an object type node 510, an alpha node 515, a left input adapter node 525, a beta node 530 a first rule terminal node (RTN_1) 540 and a second rule terminal node (RTN_2) 545. The alpha node 515 has a declared relevant properties mask 520 with a value of 00010. The beta node 530 has a declared left relevant properties mask 532 also with a value of 00010 and a declared right relevant properties mask 534 with a value of 00001.

As shown, both the first and second rule terminal nodes 540, 545 depend from the alpha node 515. Accordingly, there are two branches in the Rete network 500 that receive inputs from left input adapter 525.

Rule terminal nodes do not typically have constraints. However, custom defined properties, called observed or watched properties, may be added to a rule. These custom defined properties are object properties that are not necessarily constraints of any nodes, but that a user has determined are relevant nonetheless. Relevant properties bitmasks identifying such observed properties may be added to rule terminal nodes and/or beta nodes in the Rete network.

Suppose that objects having a particular object type associated with object type node 510 have five properties, labeled a, b, c, d and e. Each of these properties may be associated with a bitmask as follows:

a→ . . . 00001
b→ . . . 00010
c→ . . . 00100
d→ . . . 01000
e→ . . . 10000

For such objects, the situation described in FIG. 5 can be created in practice with the following 2 rules:

```
rule R1 when
    $f1 : Fact( b == 0 ) @watch( e )
then
    // do something with $f1
end
rule R2 when
    $f1 : Fact( b == 0 ) @watch( d )
    $f2 : Fact( a == $f1.a ) @watch( c )
then
    // do something else with $f1 and $f2
end
```

These example rules are written in the Drools® Rule Language. However, it should be understood that any rule language may be used for the rules.

The annotation "@watch" in the rules indicates user defined watched properties. For instance, the rule R1 should be completely evaluated when property b (the property tested in the constraint) of a given object has been modified. However, in rule R1 a user decided, for his own business needs, that he wants that rule to be fully evaluated even if there's a change in the property e and declared it using the @watch annotation.

In rule R2, the first constraint is identical to the one in R1, so the alpha node created for R1 can be shared and reused for R2. However, in R2 the user added a different "watched property" of property d. This means that the alpha node should propagate all objects having a modification on the properties b, d or e. Accordingly, an inferred relevant properties mask 522 is created for the alpha node 515 by performing a union of properties b, d and e, as follows: b (00010)+d (01000)+e (10000)=11010.

Since an alpha node can be shared among multiple rules having different sets of "watched properties," the masks related with these watched properties are represented in the first non-shared node after the alpha node (in the illustrated example RTN_1 540 for R1 and the beta node 530 for R2). Accordingly, RTN_1 540 has a declared relevant properties mask 554 with a value of 10000 (the watched property e). Similarly, RTN_2 545 has a declared relevant properties mask 552 with a value of 00100 (watched property c) and Beta node 530 has a declared left relevant properties mask 532 with a value of 01000 (watched property d).

Inferred relevant properties masks may be determined for each of the nodes using the declared relevant properties masks of those nodes as well as declared masks of parent and/or child nodes. For example, an inferred relevant properties mask 542 is computed for RTN_1 540 by combining the declared relevant properties mask 520 of the alpha node 515 (with a value of 00010) with the declared relevant properties mask 554 of RTN_1 540 (with a value of 10000), which results in a value of 10010. Similarly, a declared relevant properties mask 552 of RTN_2 545 (having a value of 00100) may be combined with a declared right relevant properties mask 534 of the beta node 530 (having a value of 00001) to form an inferred right relevant properties mask 536 for beta node 530 having a value of 00101. A declared left relevant properties mask of the beta node 530 (having a value of 01000) may be combined with a declared relevant properties mask 520 of the alpha node 515 (having a value of 00010) to form an inferred left relevant properties mask 538 for beta node 530 having a value of 01010. The declared relevant properties mask 520 of the alpha node 515 (with a value of 00010) may be combined with the declared relevant properties mask 554 of RTN_1 540 (having a value of 10000) and the declared right relevant properties ask 532 of beta node 530 (having a value of 01000) to form an inferred relevant properties mask 522 for the alpha node 515 having a value of 11010.

Rule terminal nodes are not typically associated with constraints on objects. Accordingly, in the absence of user declared watched properties, an object that arrives at a rule terminal node should be processed by the rule terminal node regardless of that object's modified properties. Watched properties may be represented in the declared relevant properties masks of the first non-shared node associated with a rule. Accordingly, if a rule terminal node is the first non-shared node associated with a particular rule, then that rule terminal node will have an inferred mask that will block some objects based on modified properties of those objects. An example of such a rule terminal node is RTN_1 540. However, if the rule terminal node is not the first non-shared node associated with a particular rule, then the decision of whether or not to block an object may be made at a parent node of that rule terminal node. For such rule terminal nodes, the rule terminal node may be assigned an inferred relevant properties mask that identifies all object properties (e.g., with all 1 s). This indicates that the rule terminal node will pass any object that is input into it. An example of such a rule terminal node is RTN_2 545, which has an inferred mask 550 having a value of 11111. In one embodiment, the inferred relevant properties mask for a rule terminal node is the sum of all the relevant properties masks in the path to the rule terminal node. Note that the above discussion also applies to other relevant properties data structures than relevant properties masks.

If, for example, we have a change in the property d for an object, it would be undesirable to block the propagation of the object in the alpha node 515, because we are watching that property in R2. However, for rule R1, the propagation would be blocked by the subsequent node, RTN_1 540 in our case, because it's inferred mask 542 (10010) has an empty intersection with the mask of property d (01000). So a change in d won't be propagated in R1 as requested by the rule's constraint.

Rete networks may be reconfigured dynamically as new rules are added to or subtracted from the rule base used to establish the Rete network. If for some reason a user decides to revoke rule R1, for example, RTN_1 would be deleted from the Rete network 500 and the inferred mask of the Alpha node 515 can be recalculated by adding its declared mask 520 (b=00010) to all the declared masks of all the remaining nodes for which the alpha node is a source (only the beta node 530 in this case). Accordingly, if rule R1 were deleted, the inferred mask 522 would be recomputed and have a new value of 01010.

Figure 6:
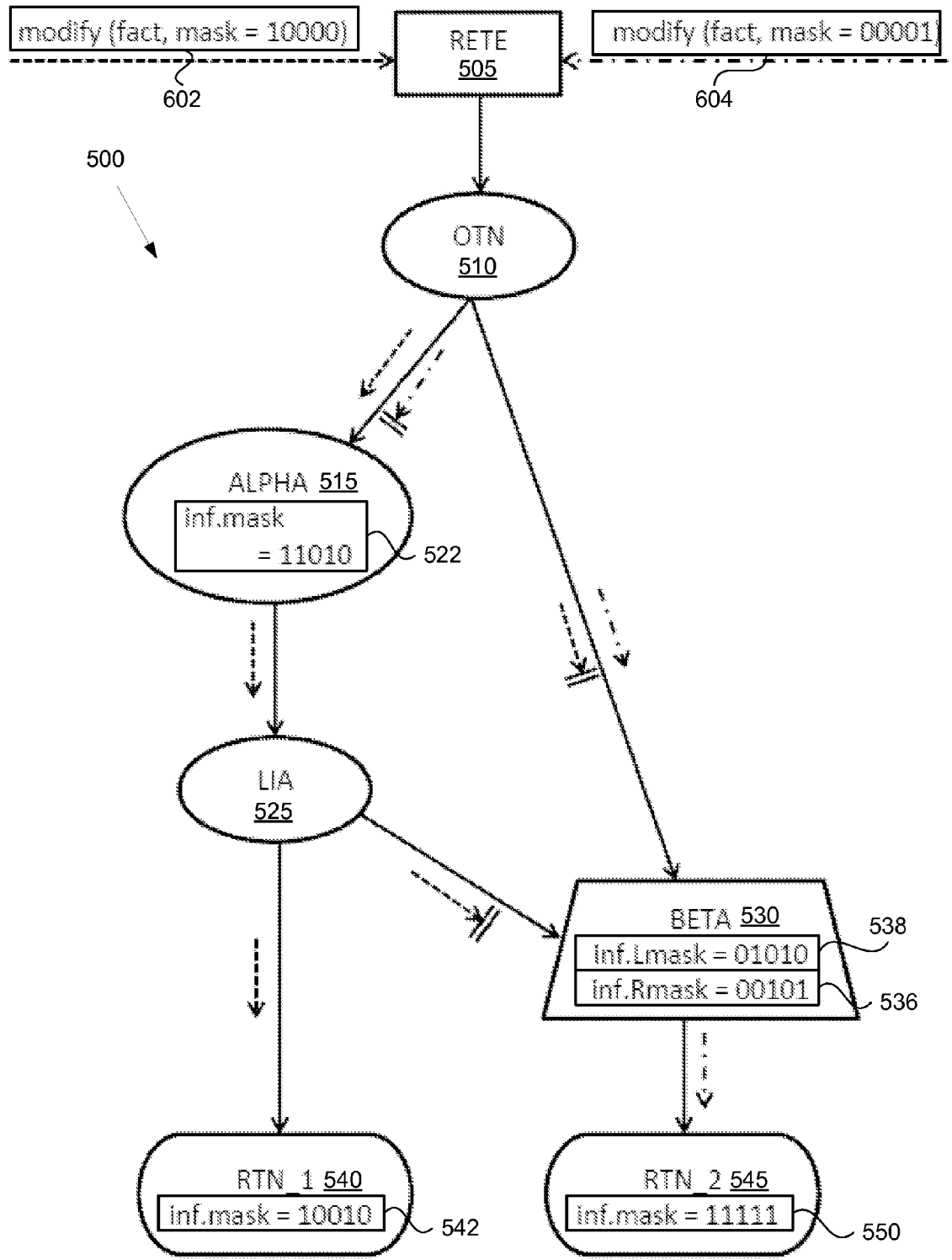
FIG. 6 illustrates propagation of two modified objects through the example Rete network of FIG. 5, in accordance with an embodiment of the present invention.

FIG. 6 illustrates propagation of two modified objects through the example Rete network 500 of FIG. 5, in accordance with an embodiment of the present invention. As shown, a first modified object 602 is associated with a modified properties mask having a value of 10000 and a second modified object 604 is associated with a modified properties mask having a value of 00001. Both objects 602 and 604 are input into Rete node 505, propagated through OTN 510, and sent to alpha node 515 and beta node 530. At alpha node 515, the modified properties mask of objects 602 and 604 are compared to the inferred relevant properties mask 512 of the alpha node 515 by performing intersection operations between the modified properties masks and the inferred relevant properties mask 522. There is an intersection between the modified properties mask of object 602 and the inferred mask 522, but no intersection between the modified properties mask of object 604 and the inferred mask 522. Accordingly, object 604 is blocked at alpha node 515, while object 602 is propagated through alpha node 515.

Object 602 is sent to LIA 535, which creates a tuple based on object 602. The tuple for object 602 is then sent to RTN_1 540 and to the left input of beta node 530. At RTN_1 540, an intersection operation is performed between the modified properties mask of the object 602 and the inferred mask 542 of RTN_1 540. Since there is an intersection between these two masks, RTN_1 540 processes the object 602 and adds the object to an agenda for execution.

At beta node 530, an intersection is performed between the modified properties mask of object 602 and the inferred left relevant properties mask 528 of the beta node 530. Since there is no intersection between these masks, the object 602 is blocked at the left input of beta node 530.

At beta node 530, intersections are also performed between the inferred right relevant properties mask 536 of Beta node 530 and the modified properties masks associated with object 602 and object 604. Since there is no intersection between the mask of object 602 and the inferred right mask 536 of beta node 530, object 602 is blocked at beta node 530. However, there is an intersection between the mask of object 604 and the inferred right mask 536 of beta node 530. Accordingly, object 604 may be added to a left input memory of the beta node 530, and may later progress through beta node 530 and on to RTN_2 545 once another object satisfying the conditions of alpha node 515 and beta node's 530 left input is joined with the object 604. At RTN_2 545, an intersection operation is performed between the modified properties mask for object 604 and the inferred mask 550 associated with RTN_2 545. This would result in an intersection, and so the object 604 would be added to an agenda for execution.

Figure 7:
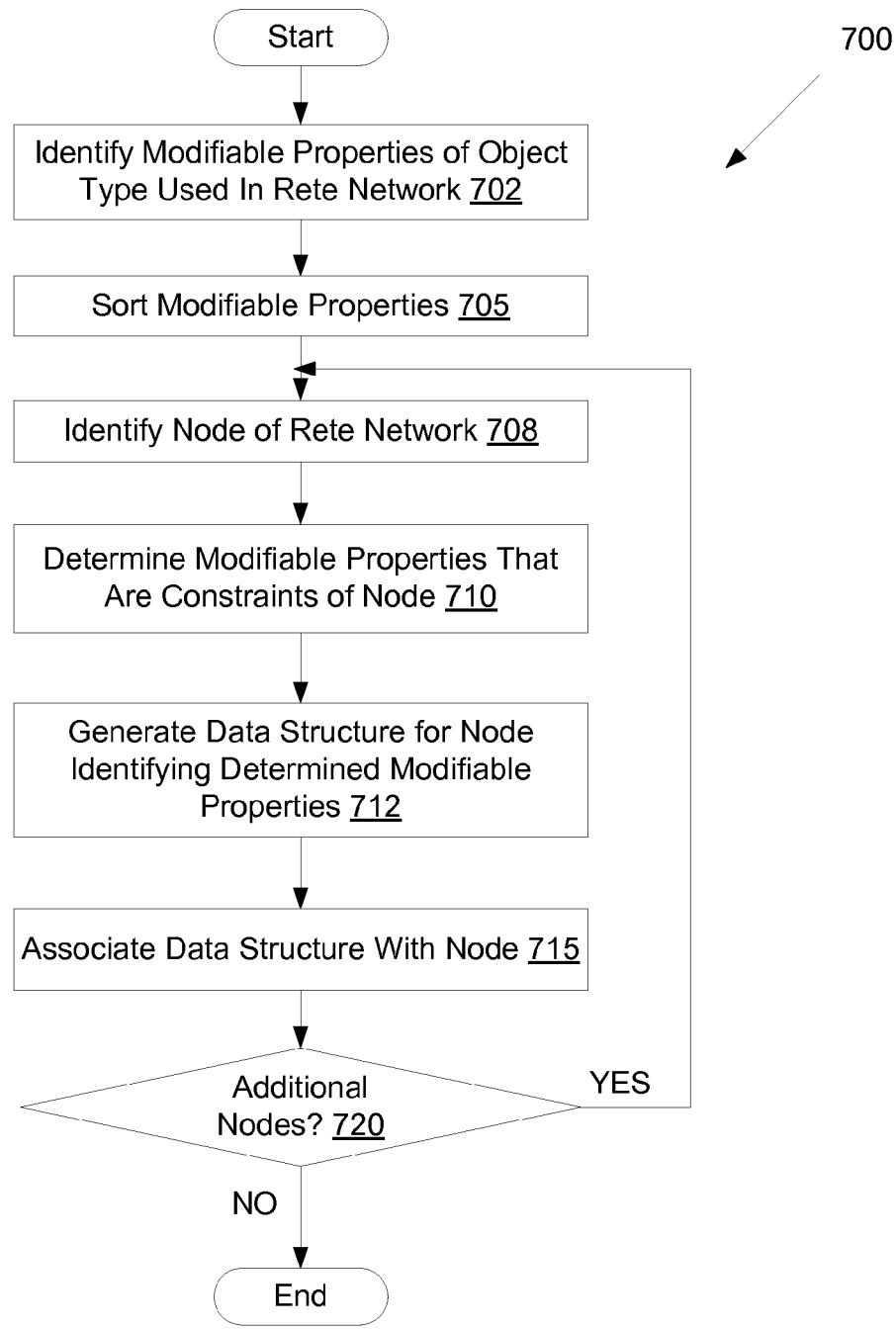
FIG. 7 illustrates one embodiment of a method to configure a Rete network that considers modified properties of objects before processing those objects by nodes of the Rete network.

FIG. 7 illustrates one embodiment of a method 700 to configure a Rete network that considers modified properties of objects before processing those objects by nodes of the Rete network. The method may be performed by processing logic that may comprise hardware (e.g., circuitry, dedicated logic, programmable logic, microcode, etc.), software (such as instructions run on a processing device), firmware, or a combination thereof. For example, computing device 1000 in FIG. 10 may perform at least part of the method in some embodiments.

Referring to FIG. 7, at block 702 processing logic identifies modifiable properties of an object type used in the Rete network. At block 705, processing logic sorts the modifiable properties. Modifiable properties may be sorted, for example, alphabetically, alphanumerically, or in some other deterministic fashion. Processing logic may then determine data structures (e.g., bitmasks) for the sorted modifiable properties. If the data structures are bitmasks, each bit position in the bitmask may represent a particular modifiable property. For example, if there are 10 modifiable properties in a particular object type, then generated bitmasks may have a minimum of 10 bits.

At block 708, processing logic identifies a node of the Rete network. At block 710, processing logic determines what modifiable property or modifiable properties are constraints of the node. At block 712, processing logic generates a data structure for the node identifying the determined modifiable property or properties that are constraints for that node. The data structure may be a bitmask having at least a number of bit positions that corresponds to a number of modifiable properties for the object type. Bits representing the properties that are constraints for the node may be set in the bitmask. The set bits indicate that the properties represented by those bits are relevant to the node.

At block 715, processing logic associates the generated data structure with the node. At block 720, processing logic determines whether there are any additional nodes in the Rete network. If there are additional nodes, the process returns to block 708 and is repeated for another node. If there are no additional nodes, the process ends.

Figure 8:
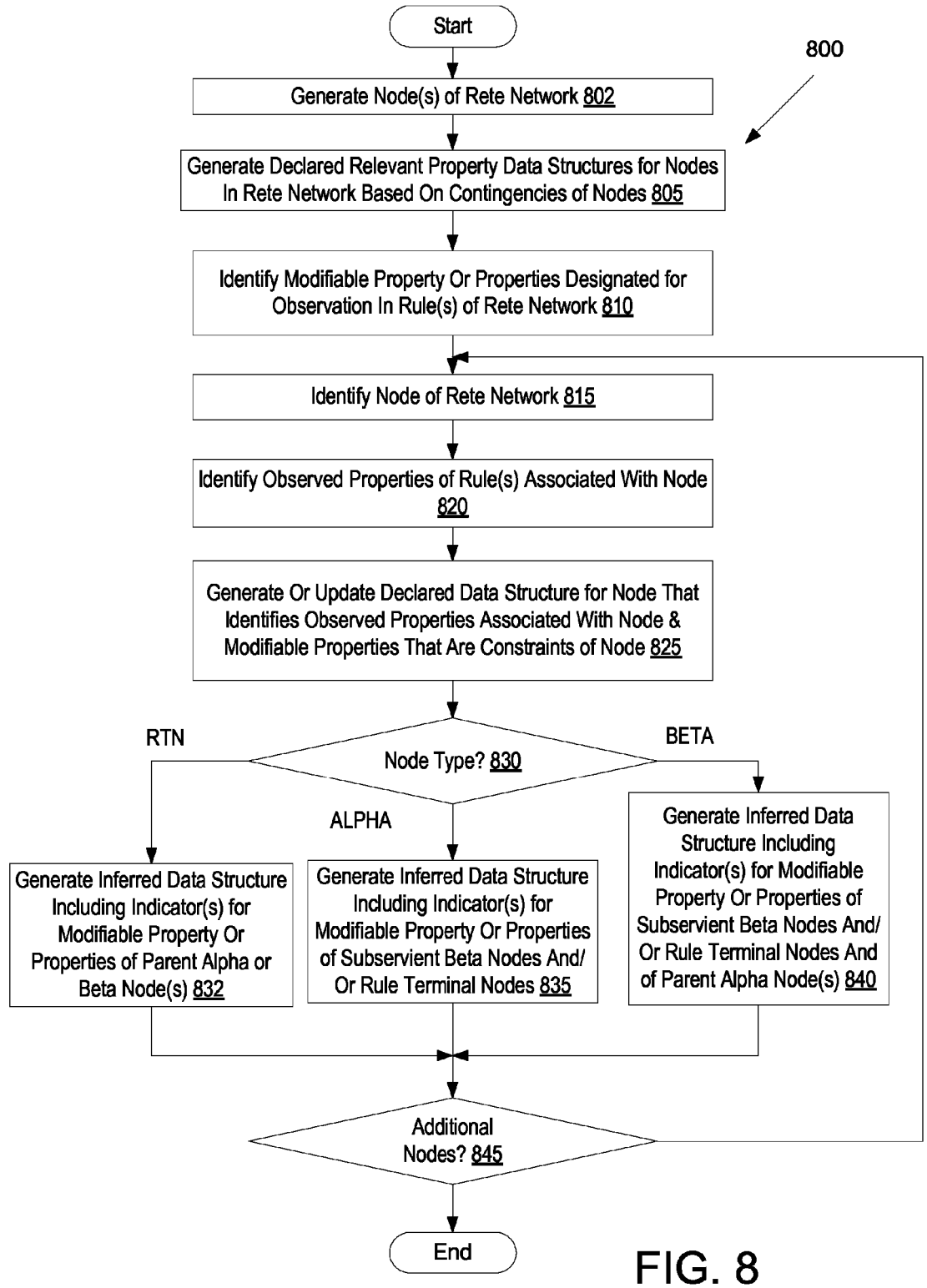
FIG. 8 illustrates another embodiment of a method to configure a Rete network that considers modified properties of objects before processing those objects by nodes of the Rete network.

FIG. 8 illustrates another embodiment of a method 800 to configure a Rete network that considers modified properties of objects before processing those objects by nodes of the Rete network. The method may be performed by processing logic that may comprise hardware (e.g., circuitry, dedicated logic, programmable logic, microcode, etc.), software (such as instructions run on a processing device), firmware, or a combination thereof. For example, computing device 1000 in FIG. 10 may perform at least part of the method in some embodiments.

Referring to FIG. 8, at block 802 processing logic generates one or more nodes of a Rete network. At block 805, processing logic generates declared relevant properties data structures for nodes of the Rete network based on constraints of the nodes. The declared relevant properties data structures identify object properties that are constraints of associated nodes.

At block 810, processing logic identifies modifiable properties designated for observation in rules used to form the Rete network. At block 815, processing logic identifies a node of the Rete network. At block 820, processing logic identifies any observed properties of rules associated with the node. At block 825, if the node did not have a declared relevant property data structure (e.g., if the node is a rule terminal node), then a declared relevant property data structure may be generated for that node based on a watched property or properties for that node. If the node had a declared relevant property data structure, then an identifier for the observed property or properties associated with that node may be added to the declared relevant properties data structure.

At block 830, processing logic determines a node type of the identified node. If the node is a rule terminal node, the method proceeds to block 832. If the node is an alpha node, the method continues to block 835. If the node is a beta node, the method continues to block 840.

At block 832, processing logic generates an inferred relevant properties data structure for the rule terminal node. The inferred data structure may incorporate identifiers included in a declared data structure for the rule terminal node (if there is one) and identifiers for the declared data structures of any alpha nodes or beta nodes that are parents of the rule terminal node. In one embodiment, the inferred data structure is generated by performing a union (e.g., a bitwise OR) of these data structures.

At block 835, processing logic generates an inferred data structure for the alpha node. The inferred data structure may incorporate identifiers included in a declared data structure for the alpha node and identifiers for the declared data structures of any rule terminal nodes or beta nodes that are children of the alpha node. In one embodiment, the inferred data structure is generated by performing a union of these declared data structures.

At block 840, processing logic generates an inferred data structure for the beta node. The inferred data structure may incorporate identifiers included in a declared data structure for the beta node and identifiers for the declared data structures of any subservient rule terminal nodes or beta nodes that are children of the beta node and of any alpha nodes or beta nodes that are parents of the beta node. In one embodiment, the inferred data structure is generated by performing a union of these declared data structures.

At block 845, processing logic determines whether there are any additional nodes for which watched properties have not been considered and/or for which inferred data structures have not been considered. If so, the process returns to block 815. Otherwise, the process ends.

Figure 9:
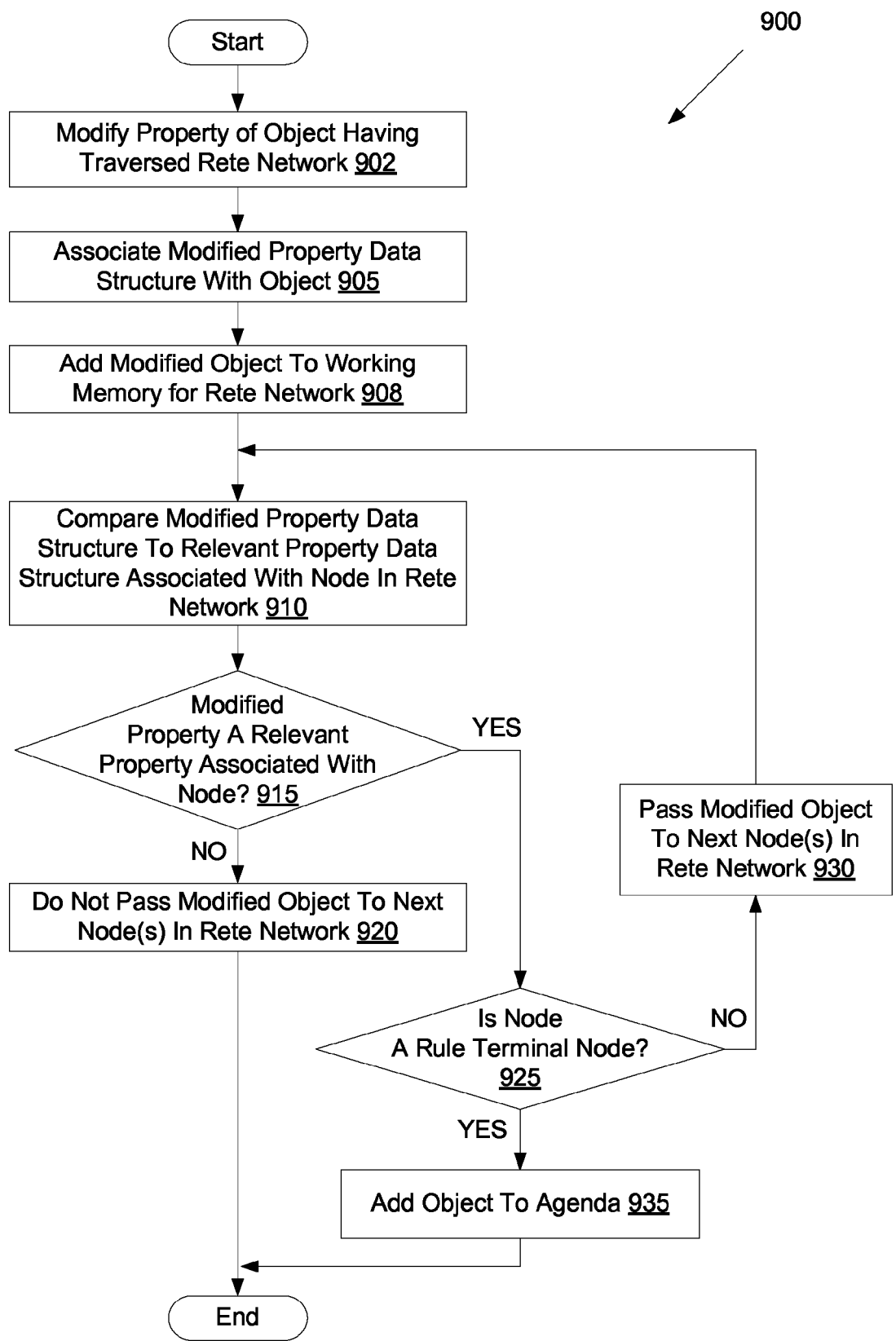
FIG. 9 illustrates one embodiment of a method to process a modified object using a Rete network.

FIG. 9 illustrates one embodiment of a method 900 to process a modified object using a Rete network. The method may be performed by processing logic that may comprise hardware (e.g., circuitry, dedicated logic, programmable logic, microcode, etc.), software (such as instructions run on a processing device), firmware, or a combination thereof. For example, computing device 1000 in FIG. 10 may perform at least part of the method in some embodiments.

Referring to FIG. 9, at block 902 processing logic modifies a property of an object that has traversed a Rete network. The property of the object is modified in accordance with a rule that has had its constraints fully matched. At block 905, processing logic associates a modified property data structure with the modified object. The modified property data structure may be a bitmask having a bit position for each modifiable property of the object, where those bits in the bitmask that are associated with the modified properties are set (e.g., are 1 s). At block 908, the modified object is added to a working memory for the Rete network.

At block 910, processing logic compares the modified property data structure to a relevant property data structure associated with a node in the Rete network. If the two data structures are bitmasks, then the comparison may be performed by performing an intersection operation (e.g., a bitwise AND (between the two bitmasks. A positive intersection result indicates that at least one modified property is a relevant property for the node. At block 915, if a modified property of the object is a relevant property of the node, the method continues to block 925. Otherwise, the method proceeds to block 920. At block 920, processing logic does not pass the modified object to a next node or nodes in the Rete network. Additionally, the modified object may be removed from an input memory of the node in question.

At block 925, processing logic determines whether the node is a rule terminal node. If the node is a rule terminal node, then all of the constraints associated with a rule represented by the rule terminal node have been satisfied. Accordingly, the object is added to an agenda at block 935, and the rule will be executed (e.g., an action will be performed on the object in accordance with the rule). If the node is not a rule terminal node, the method continues to block 930, and the object is passed to a next node or nodes in the Rete network. The method then returns to block 910 for those nodes.

Note that a Rete network traditionally includes many branches, in which multiple nodes may be children of a particular parent node. The operations of blocks 910-935 may be performed in parallel or in sequence for the different branching nodes. For example, if at block 930 the modified object is passed to three different next nodes in the Rete network, then the operations of block 910 would be performed separately for each of the three nodes.

Figure 10:
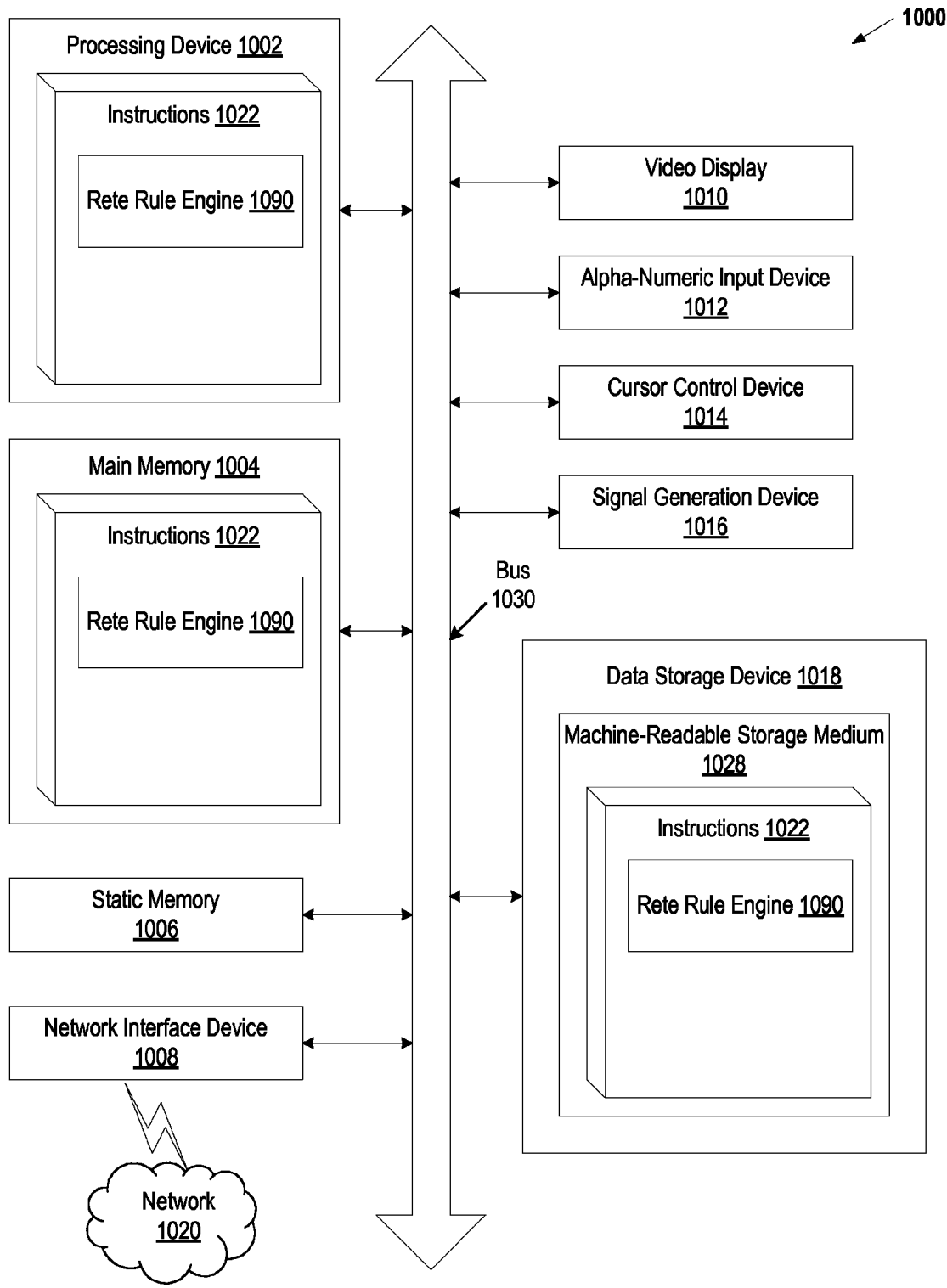
FIG. 10 illustrates a block diagram of an exemplary computing device.

FIG. 10 illustrates a diagrammatic representation of a machine in the exemplary form of a computing device 1000 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a tablet computer, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing device 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 may represent one or more general-purpose processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic (e.g., instructions 1022) for performing the operations and steps discussed herein.

The computing device 1000 may further include a network interface device 1008. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1028 on which is stored one or more sets of instructions 1022 embodying any one or more of the methodologies or functions described herein. The instructions 1022 may also reside, completely or at least partially, within the main memory 1004 and/or within the processing device 1002 during execution thereof by the computing device 1000, the main memory 1004 and the processing device 1002 also constituting machine-accessible storage media. In one embodiment, instructions 1022 includes instructions for a Rete rule engine 1090 that includes a relevancy determiner and that performs operations described herein above.

While the machine-readable storage medium 1028 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing a set of instructions for execution by the machine and that cause the machine to perform any one or more of the methodologies of the present invention. The term "machine-readable storage medium" shall accordingly be taken to include, but not be limited to, solid-state memories, optical and magnetic media.

It is to be understood that the above description is intended to be illustrative, and not restrictive. Many other embodiments will be apparent to those of skill in the art upon reading and understanding the above description. The scope of embodiments should, therefore, be determined with reference to the appended claims, along with the full scope of equivalents to which such claims are entitled.

What is claimed is:

1. A method comprising:
    modifying, by a processing device executing a Rete rule engine, a particular property of an object that has traversed a Rete network;
    associating, by the processing device, a first data structure with the object, the first data structure indicating that the particular property of the object has been modified;
    determining, by the processing device, whether the particular property is a constraint relevant to a node of the Rete network based on comparing the first data structure to a second data structure associated with the node, wherein the second data structure identifies one or more modifiable properties that are constraints relevant to the node;
    evaluating the object with the node responsive to determining that the particular property is a constraint relevant to the node; and
    determining not to evaluate the object with the node responsive to determining that the particular property is not a constraint relevant to the node.

2. The method of claim 1, wherein:
    the first data structure is a modified properties bitmask, each modifiable property of the object being represented by a bit of the modified properties bitmask, wherein the bit of the modified properties bitmask representing the particular property that has been modified is set in the modified properties bitmask;
    the object has an object type; and
    the second data structure is a relevant properties bitmask, each modifiable property of objects having the object type being represented by a bit of the relevant properties bitmask, wherein one or more bits representing the one or more modifiable properties of the object type that are constraints relevant to the node are set in the relevant properties bitmask.

3. The method of claim 2, wherein:
    comparing the modified properties bitmask to the relevant properties bitmask comprises performing an intersection operation between the modified properties bitmask and the relevant properties bitmask;
    determining that the particular property is a constraint relevant to the node comprises identifying that the intersection operation outputs an intersection; and
    determining that the particular property is not a constraint relevant to the node comprises identifying that the intersection operation outputs no intersection.

4. The method of claim 2, further comprising:
    identifying a plurality of modifiable properties of the object type;
    sorting the plurality of modifiable properties; and
    generating the modified properties bitmask and the relevant properties bitmask based on the sorted plurality of modifiable properties, each of the modified properties bitmask and the relevant properties bitmask having corresponding bit positions that represent the plurality of modifiable properties.

5. The method of claim 1, wherein the particular property is a constraint relevant to the node if at least one of a) the particular property is a constraint of the node, b) the particular property is a constraint of an additional node that is subordinate to the node in the Rete network or c) the particular property is a user defined watched property.

6. The method of claim 1, further comprising:
    generating the second data structure along with a plurality of additional data structures;
    associating the second data structure with the node; and
    associating the plurality of additional data structures with a plurality of additional nodes in the Rete network, wherein each of the plurality of additional data structures identifies constraints that are relevant to one of the plurality of additional nodes.

7. The method of claim 1, wherein the node is an alpha node of the Rete network that is shared by a plurality of rule terminal nodes, and wherein the one or more properties identified by the second data structure comprise first properties that are constraints relevant to a first rule terminal node and second properties that are constraints relevant to a second rule terminal node.

8. The method of claim 1, wherein the node is a beta node of the Rete network, wherein the second data structure is associated with a first one of a right input or a left input of the beta node, and wherein a third data structure that identifies one or more additional properties that are constraints relevant to the node is associated with a remaining one of the right input or the left input.

9. A non-transitory computer readable storage medium having instructions for a Rete rule engine that, when executed by a processing device, cause the processing device to perform operations comprising:
modifying, by the processing device executing the Rete rule engine, a particular property of an object;
associating, by the processing device, a first data structure with the object, the first data structure indicating that the particular property of the object has been modified;
determining, by the processing device, whether the particular property is a constraint relevant to a node of a Rete network based on comparing the first data structure to a second data structure associated with the node, wherein the second data structure identifies one or more modifiable properties that are constraints relevant to the node;
evaluation the object with the node responsive to determining that the particular property is a constraint relevant to the node; and
determining not to evaluate the object with the node responsive to determining that the particular property is not a constraint relevant to the node.

10. The non-transitory computer readable storage medium of claim 9, wherein:
the first data structure is a modified properties bitmask, each modifiable property of the object being represented by a bit of the modified properties bitmask, wherein the bit of the modified properties bitmask representing the particular property that has been modified is set in the modified properties bitmask;
the object has an object type; and
the second data structure is a relevant properties bitmask, each modifiable property of objects having the object type being represented by a bit of the relevant properties bitmask, wherein one or more bits representing the one or more modifiable properties of the object type that are constraints relevant to the node are set in the relevant properties bitmask.

11. The non-transitory computer readable storage medium of claim 10, wherein:
comparing the modified properties bitmask to the relevant properties bitmask comprises performing an intersection operation between the modified properties bitmask and the relevant properties bitmask;
determining that the particular property is a constraint relevant to the node comprises identifying that the intersection operation outputs an intersection; and
determining that the particular property is not a constraint relevant to the node comprises identifying that the intersection operation outputs no intersection.

12. The non-transitory computer readable storage medium of claim 10, the operations further comprising:
identifying a plurality of modifiable properties of the object type;
sorting the plurality of modifiable properties; and
generating the modified properties bitmask and the relevant properties bitmask based on the sorted plurality of modifiable properties, each of the modified properties bitmask and the relevant properties bitmask having corresponding bit positions that represent the plurality of modifiable properties.

13. The non-transitory computer readable storage medium of claim 10, wherein the particular property is a constraint relevant to the node if at least one of a) the particular property is a constraint of the node, b) the particular property is a constraint of an additional node that is subordinate to the node in the Rete network or c) the particular property is a user defined watched property.

14. The non-transitory computer readable storage medium of claim 9, the operations further comprising:
generating the second data structure along with a plurality of additional data structures;
associating the second data structure with the node; and
associating the plurality of additional data structures with a plurality of additional nodes in the Rete network, wherein each of the plurality of additional data structures identifies constraints that are relevant to one of the plurality of additional nodes.

15. The non-transitory computer readable storage medium of claim 9, wherein the node is an alpha node of the Rete network that is shared by a plurality of rule terminal nodes, and wherein the one or more properties identified by the second data structure comprise first properties that are constraints relevant to a first rule terminal node and second properties that are constraints relevant to a second rule terminal node.

16. The non-transitory computer readable storage medium of claim 9, wherein the node is a beta node of the Rete network, wherein the second data structure is associated with a first one of a right input or a left input of the beta node, and wherein a third data structure that identifies one or more additional properties that are constraints relevant to the node is associated with a remaining one of the right input or the left input.

17. A computing device comprising:
a memory having instructions for a Rete rule engine; and
a processing device, coupled to the memory, to execute the Rete rule engine, the processing device further to:
modify a particular property of an object that has traversed a Rete network;
associate a first data structure with the object, the first data structure indicating that the particular property of the object has been modified;
determine whether the particular property is a constraint relevant to a node of the Rete network based on comparing the first data structure to a second data structure associated with the node, wherein the second data structure identifies one or more modifiable properties that are constraints relevant to the node;
evaluate the object with the node responsive to determining that the particular property is a constraint relevant to the node; and
determine not to evaluate the object with the node responsive to determining that the particular property is not a constraint relevant to the node.

18. The computing device of claim 17, wherein:
the first data structure is a modified properties bitmask, each modifiable property of the object being represented by a bit of the modified properties bitmask, wherein the bit of the modified properties bitmask representing the particular property that has been modified is set in the modified properties bitmask;
the object has an object type; and
the second data structure is a relevant properties bitmask, each modifiable property of objects having the object type being represented by a bit of the relevant properties bitmask, wherein one or more bits representing the one or more modifiable properties of the object type that are constraints relevant to the node are set in the relevant properties bitmask.

19. The computing device of claim 18, wherein:

comparing the modified properties bitmask to the relevant properties bitmask comprises performing an intersection operation between the modified properties bitmask and the relevant properties bitmask;

determining that the particular property is a constraint relevant to the node comprises identifying that the intersection operation outputs an intersection; and determining that the particular property is not a constraint relevant to the node comprises identifying that the intersection operation outputs no intersection.

20. The computing device of claim 17, wherein the processing device is further to:

generate the second data structure along with a plurality of additional data structures;

associate the second data structure with the node; and associate the plurality of additional data structures with a plurality of additional nodes in the Rete network, wherein each of the plurality of additional data structures identifies constraints that are relevant to one of the plurality of additional nodes.

* * * * *